United States Patent [19]
Schmidt et al.

[11] Patent Number: 5,425,575
[45] Date of Patent: Jun. 20, 1995

[54] ELECTROMAGNETIC VALVE HOUSING CONTAINING THROTTLE AND CHECK VALVE WHICH PERMIT ARMATURE STROKE ADJUSTMENT

[75] Inventors: Klaus Schmidt; Werner Wilde, both of Schwieberdingen; Norbert Alaze, Markgröningen; Kurt Herzog, Bietigheim-Bissingen; Klaus Müller, Tamm; Friedrich Megerle, Sonthofen; Dietmar Baumann, Möglingen, all of Germany

[73] Assignee: Robert Bosch GmbH, Stuttgart, Germany

[21] Appl. No.: 211,415

[22] PCT Filed: Sep. 2, 1992

[86] PCT No.: PCT/DE92/00728
§ 371 Date: Mar. 30, 1994
§ 102(e) Date: Mar. 30, 1994

[87] PCT Pub. No.: WO93/07032
PCT Pub. Date: Apr. 15, 1993

[30] Foreign Application Priority Data
Sep. 30, 1991 [DE] Germany .................. 41 32 471.4

[51] Int. Cl.6 .................. F16K 31/06; B60T 13/68; B60F 8/36; B60K 28/16
[52] U.S. Cl. .................. 303/119.2; 303/900
[58] Field of Search .................. 303/119.1, 119.2, 84.1, 303/84.2, 900, 901, 115.2; 137/599, 854, 118

[56] References Cited
U.S. PATENT DOCUMENTS

| | | | |
|---|---|---|---|
| 4,790,351 | 12/1988 | Kervagoret | 303/119.2 X |
| 5,167,442 | 12/1992 | Alaze et al. | 303/901 X |
| 5,244,261 | 9/1993 | Ohe | 303/115.2 |
| 5,267,785 | 12/1993 | Maisch | 303/901 X |
| 5,335,984 | 8/1994 | Alaze et al. | 303/900 X |

*Primary Examiner*—Josie A. Ballato
*Attorney, Agent, or Firm*—Edwin E. Greigg; Ronald E. Greigg

[57] ABSTRACT

A valve whose valve stroke must be adjusted is provided with a throttle bore. The valve has a guide tube open on the bottom with a press-fit in a valve body through whose through bore the valve closing member of an armature received in a guide tube is accessible for engagement by a scanner pin of a measuring tool. After adjustment of the valve stroke, a throttle insert is introduced into the throttle bore of the valve body, using a double-lipped cuff. While an inner lip seals off the throttle insert in the valve body, an outer lip of the cuff, in cooperation with a housing receives the valve and takes on the function of a check valve. The valve is suitable for anti-lock and/or traction-control systems of motor vehicle brake systems.

2 Claims, 2 Drawing Sheets

ELECTROMAGNETIC VALVE HOUSING CONTAINING THROTTLE AND CHECK VALVE WHICH PERMIT ARMATURE STROKE ADJUSTMENT

BACKGROUND OF INVENTION

The invention is based on an electromagnetic valve, disposed in a valve block, for hydraulic brake systems of motor vehicles with an anti-lock and/or traction-control system, as defined hereinafter.

One such valve has already been proposed (German Patent Application P 40 30 963.0, published after the priority date of the present application), in which adjusting the armature stroke can be done only with difficulty, because a throttle disk with a very small throttle bore makes it difficult to use a measuring tool with a scanner pin, which to engage the valve closing member must be introduced through the through bore of the valve body coaxially with the guide tube.

French Patent Disclosure FR-A 2 552 195 discloses a valve of the type referred to at the outset in which the valve body, axially adjustable by threads, engages the guide tube which is open toward the valve block. The valve body has a stepped through bore of relatively large diameter, which discharges into a valve seat. For adjusting the armature stroke, it is possible in a simple way, prior to installation of the valve in the valve block, to pass a scanner pin of a measuring tool through the through bore of the valve body, since the bore cross section is not restricted. After the adjustment operation, the valve body is form-fittingly fixed to the guide tube by a stamping operation.

ADVANTAGES OF THE INVENTION

The valve according to the invention has advantages over the prior art because it permits adjustment of the armature stroke prior to installation of the double-lipped cuff with a throttle insert. The scanner pin of a measuring tool can therefore be introduced into the valve body unhindered from the face end side of the guide tube and brought into contact with the valve closing member through the through bore of the valve body. Once the adjustment of the armature stroke has been concluded and the pole piece has been secured in the guide tube, the valve, supplemented with other components, can be completed in a simple way by insertion of the cuff connected to the annular disk and the throttle insert. The embodiment of the seal as a double-lipped cuff is also especially advantageous, because the outer lip can be used as a check valve.

By the provision recited herein, it is simple to create a component unit, with individual parts fixed in captive fashion, that can be preassembled.

DRAWING

An exemplary embodiment of the invention is shown in simplified form in the drawing and described in detail in the ensuing description.

FIG. 1 is a circuit diagram of a hydraulic brake system with electromagnetic valves, and FIG. 2 is a longitudinal section through such a valve, on a different scale.

DESCRIPTION OF THE EXEMPLARY EMBODIMENT

Figure 1:
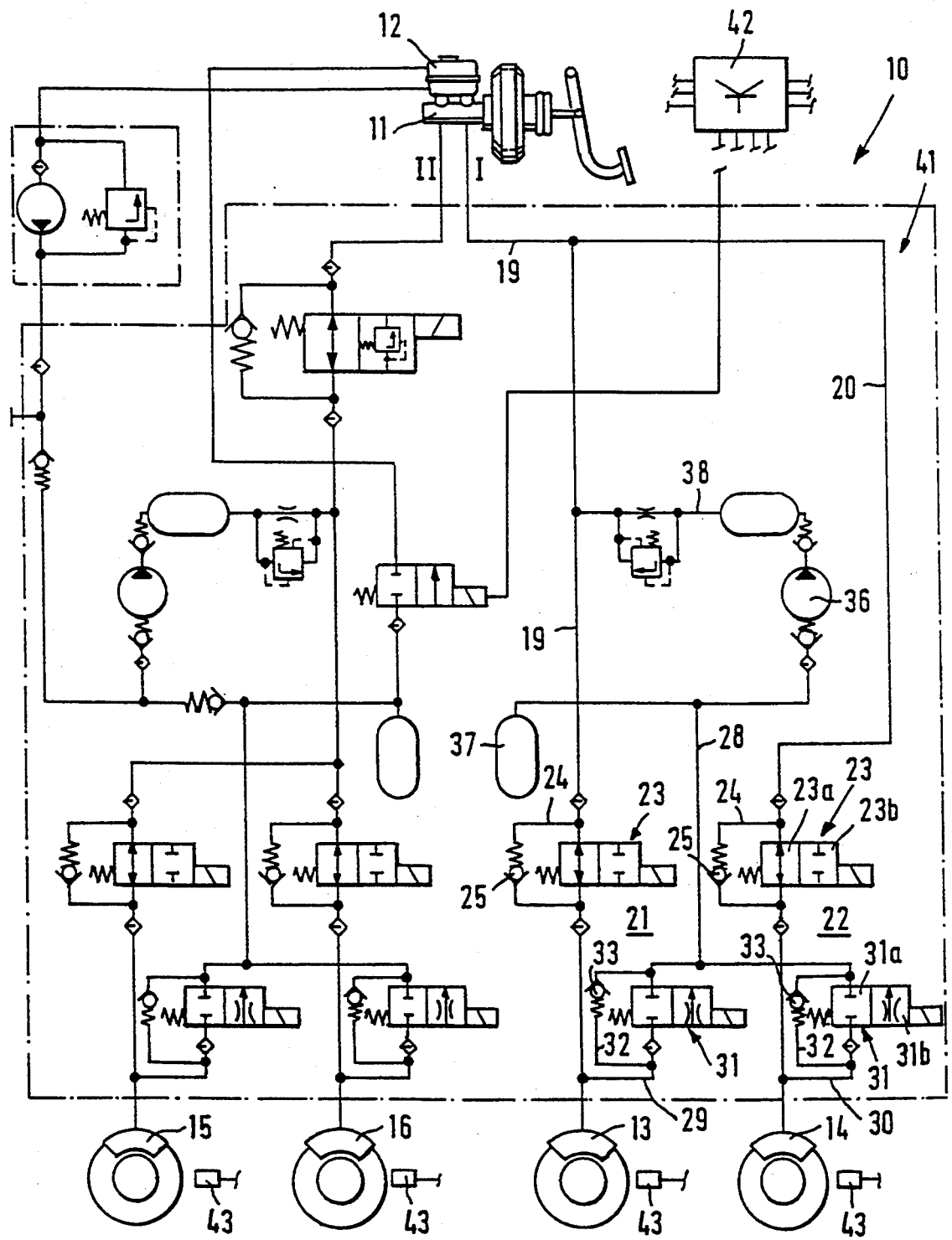

A hydraulic brake system 10 for motor vehicles, shown in FIG. 1, has a pedal-actuatable master cylinder 11 with a pressure fluid tank 12. A first brake circuit I of the brake system 10 is associated with wheel brakes 13, 14 of nondriven vehicle wheels, for instance the front axle of the vehicle. The wheel brakes 15, 16 of driven vehicle wheels, for instance of the rear axle of the vehicle, are connected to a second brake circuit II. The brake system 10 accordingly has what is known as TT-style brake circuit distribution. Brake circuit I will be described in detail below:

Brake circuit I has a first brake line 19 beginning at the master cylinder 11 and leading to the wheel brake 13. Branching off from this brake line 19 is a second brake line 20 to the second wheel brake 14 of this brake circuit I. Each of the wheel brakes 13, 14 is assigned a valve assembly 21 and 22, respectively, for brake pressure modulation. Each of the valve assemblies 21, 22 have an inlet valve 23 disposed in the corresponding brake line 19, 20. This valve is embodied as a 2/2-way valve with a spring-actuated open position 23a and an electromagnetically switchable blocking position 23b. Each inlet valve 23 is bypassed by a bypass line 24 in which there is a check valve 25. The applicable check valve 25 has an admission direction from the corresponding wheel brake 13, 14 to the master cylinder 11.

A branched return line 28 begins at the associated brake lines 19, 20 between the respective inlet valve 23 and the wheel brakes 13, 14. An outlet valve 31 of the valve assemblies 21, 22 for brake pressure modulation is disposed in each return line branch 29 and 30. The outlet valves 31 are embodied as 2/2-way valves; they have a spring-actuated blocking position 31a and an electromagnetically switchable open position 31b with throttling action. The outlet valves 31 are each bypassed by a bypass line 32 having a check valve 33 whose admission direction is toward the respective wheel brake 13, 14.

The return line 28 leads to the intake side of a high-pressure pump 36. Between the intake side of the high-pressure pump 36 and the outlet valves 31 of the valve assemblies 21, 22, a storage chamber 37 for receiving pressure fluid taken from the wheel brakes 13, 14 is connected to the return line 28. On the pressure side, a feed line 38 for pressure fluid begins at the high-pressure pump 36 and is connected to the brake line 19 between the valve assembly 21 and the master cylinder 11.

The elements of the hydraulic brake system 10 disposed between the master cylinder 11 and the wheel brakes 13–16 are part of an anti-lock and traction-control system 41. Belonging to this system 41 are an electronic control unit 42 and wheel speed sensors 43 associated with the individual vehicle wheels. The control unit 42 is capable of evaluating signals of the wheel speed sensors 43 and converting them into switching signals for the electrical components units of the brake system 10. In brake circuit I, the anti-lock mode is possible at the nondriven vehicle wheels, and in brake circuit II, not described here, both the anti-lock and the traction-control mode are possible at the driven vehicle wheels.

Figure 2:
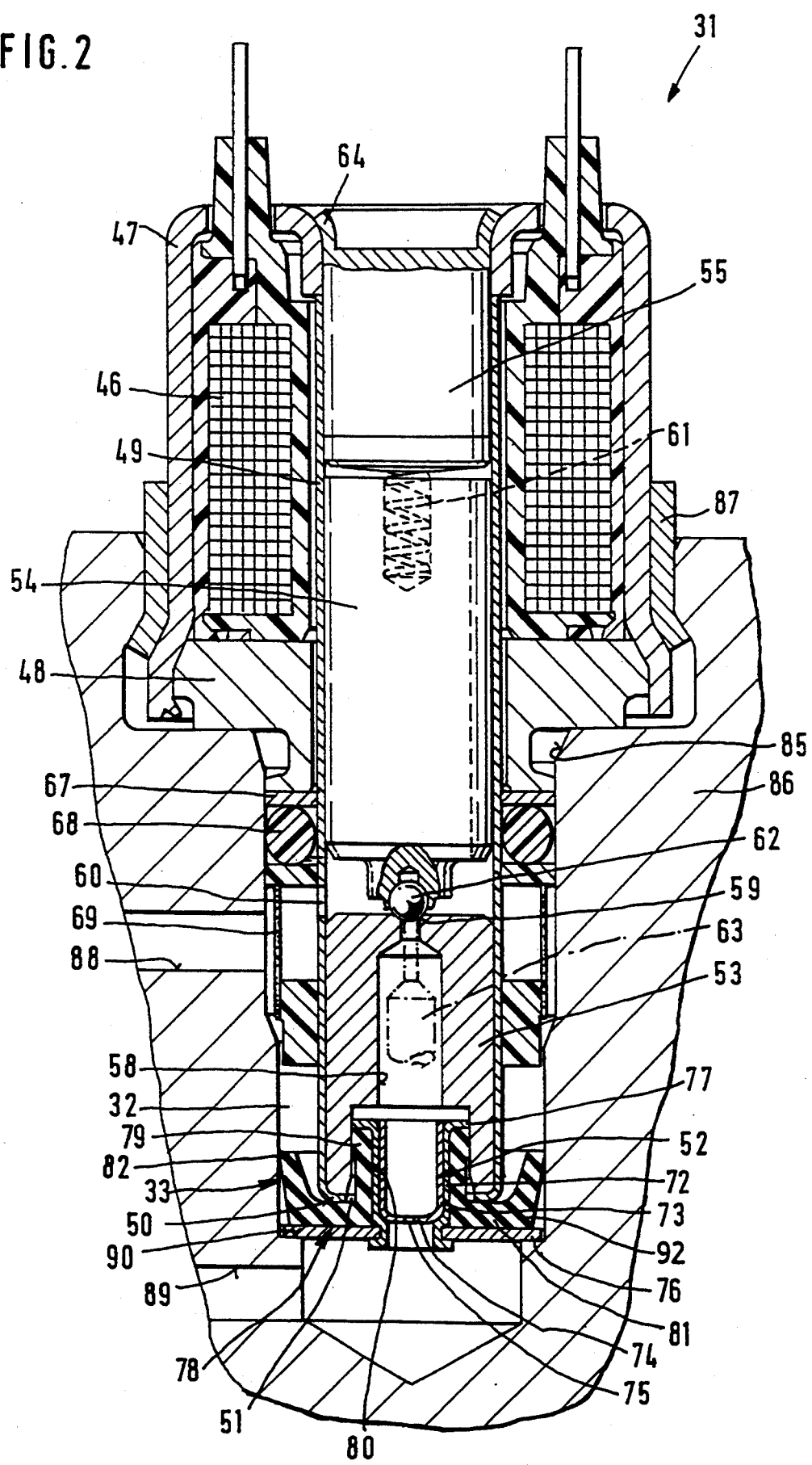

The outlet valve 31 of the valve assemblies 21, 22 for brake pressure modulation has the following structure, shown in FIG. 2:

The outlet valve 31 has a coil 46, which is surrounded on the connection and circumferential sides by a cup-shaped yoke 47. Remote from the connection side, the yoke 47 is joined to a yoke bottom 48. Both the coil 46 and the yoke bottom 48 are penetrated by a coaxially extending guide tube 49 of non-magnetizable steel. The guide tube 49, protruding outward at the bottom past the yoke bottom 48, is drawn inward at the bottom in a retraction 50, leaving a circular opening 51 free on the bottom. Received in the guide tube 49, beginning at the bottom retraction 50, are a throttle insert 52, a press-fitted valve body 53, an armature 54 that is longitudinally movable by magnetic force, and a pole piece 55.

The valve body 53 supported on the bottom retraction 50 has a stepped through bore 58, which on the armature side, after a cross section of less than 1 mm in diameter, ends in a valve seat 59. In the region of the valve seat 59, the guide tube 49 has a lateral opening 60. Under the force of the valve closing spring 61, disposed between the armature 54 and the pole piece 55 in the guide chamber 49, the valve seat 59 is engaged by a ball, as the valve closing member 62, received on the armature.

The valve seat 59 and the valve closing member 62 form a seat valve, whose stroke is adjusted by means of a length measuring tool. For that purpose, a scanner pin 63, represented by dot-dashed lines, is introduced from below into the through bore 58 of the valve body 53 prior to the installation of the throttle insert 52 and is made to engage the valve closing member 62. The armature stroke is now adjusted, by shifting the pole piece 55 in the guide tube 49. Finally, the pole piece 55 is joined to the guide tubes 49 by welding. Securing of the guide tube 49 is done by means of a crimped connection between a collar 64 of the pole piece 65 and the yoke 47.

Beginning at the yoke bottom 48, a support disk 67, a spacing ring 68 and a sleeve filter 69 are mounted on the guide tube 49. The outlet valve 31 is also completed with the aforementioned throttle insert 52, whose structure is as follows:

The throttle insert 52 has a bushlike part 72, into which a sleevelike insert 73 is press-fitted. The insert 73 has a bottom 74 with a throttle bore 75, whose diameter amounts to a few tenths of a millimeter. An annular disk 76 is fastened by crimping into the bushlike part 72 below the bottom 74 of the insert 73. Remote from the annular disk, the bushlike part 72 is provided with a flange 77.

A seal in the form of a radially sealing double-lipped cuff 78 is received in the throttle insert 52 coaxially between the flange 77 at the annular disk 76. The inner lip 79 of the cuff 78 extends, resting tightly, on the bushlike part 72, whose flange 77 fits over the face end of the inner lip 79. A bottom 81 beginning radially at the center opening 80 of the cuff 78 extends along the annular disk 76. Beginning at the outer edge of the bottom 81, the cuff 78 is provided with an outer lip 92 extending in the same direction as the inner lip 79. The flange 77 of the bushlike part 72, received tightly in the center opening 80 of the cuff 78, centers the throttle insert 52 inserted into the valve body 53. In the process, the inner lip 79 of the cuff 78 sealingly engages the inner circumference of the through bore 58 of the valve body 53.

The outlet valve 31, completed with the aforementioned components, is received in a stepped bore 85 of a valve block 86. A retaining ring 87, press-fitted circumferentially of the yoke 47, secures the outlet valve 31 in this position. Discharging into the bore 85 of the valve block 86 are two conduits carrying pressure fluid: an upper, first conduit 88 on the circumference, which communicates for instance with the wheel brake 14 of the hydraulic brake system 10 shown in FIG. 1; and a bottom conduit 89 leading to the high-pressure pump 36 or the storage chamber 37 of the brake system 10. The two conduits 88, 89 are therefore part of the return line branch 30.

In brake pressure modulation, during which, in pressure reduction phases, the outlet valve 31 is switched to its open position 31b and consequently the valve closing member 62 is lifted from the valve seat 59, pressure fluid flows through the conduit 88 in the valve block 86 and through the opening 60 into the guide tube 49, and from there flows into the conduit 89 to the high-pressure pump 36 or to the storage chamber 37, doing so via the valve seat 59 and the through bore 58 of the valve body 53, which bore is located inside the center opening 80 of the cuff 78, and by overcoming the throttle bore 75 of the throttle insert 52. The sealing ring 68 prevents an escape of pressure fluid from the bore 85 of the valve block 86. Since the outer lip 82 of the cuff 78 engages the inside circumference of the bore 85 between the two conduits 88, 89, the pressure fluid cannot bypass the throttle bore 75.

When the outlet valve 31 assumes its blocking position 31a, the pressure fluid is, however, capable of flowing from the conduit 89 to the conduit 88 by bypassing the seat valve. The annular disk 76, which is axially movable to a slight extent, lifts up from a step 90 of the bore 85, so that pressure fluid, overcoming the outer lip 82 of the cuff 78, can flow outside the guide tube 49 to the conduit 88. This flow path thus forms the bypass line 32 of FIG. 1, while the outer lip 82 of the cuff 78 physically embodies the check valve 33.

In normal braking tripped by the vehicle driver, it is possible, if the outer valve 31 does not close entirely tightly, for pressure fluid to flow into the storage chamber 37, for instance through the return line branch 30 and the return line 28. A storage chamber 37 partly filled with pressure fluid is harmful, however, if in the case of brake pressure modulation, pressure fluid has to be removed from at least one of the associated wheel brakes 13, 14. Since the storage chamber 37 has a piston (not shown) loaded by a prestressed compression spring, the pressure fluid improperly received in the storage chamber 37, if the brake is not actuated, can flow into the brake line 20 back to the master cylinder 11, and into the pressure fluid tank 12 by way of the return line 28 and the corresponding return line branch 30, overcoming the check valve 33 embodied by the cuff 78 in the bypass line 32. As a result, automatic evacuation of the storage chamber 37 takes place, and thus this chamber is available with its full capacity for brake pressure modulation.

We claim:

1. An electromagnetic valve (31), disposed in a valve block (86), for hydraulic brake systems (10) of motor vehicles with an anti-lock and/or traction-control system (41), in which:
   the following elements are at least indirectly received in a valve block, beginning at a bottom retraction (50), in a guide tube (49) that is open toward the valve block: a stationary valve body (53) includes a through bore (58) and a valve seat (59); an armature (54) is longitudinally movable by magnetic force and includes a valve closing member (62); a pole piece (55) is secured to the guide tube (49); and between the pole piece and the armature (54), a valve closing spring (61) is positioned;
   the guide tube (49) is disposed in a valve block bore (85) of the valve block (86), into said valve block bore two pressure-fluid-carrying conduits (88, 89)

discharge, one on a circumference and one on a face end of the guide tube (49);

a radially sealing seal (78) is disposed between the two conduits (88, 89), said seal on one side engages the inside circumference of the valve block bore (85) and on the other side engages the valve body (53) secured in the guide tube (49);

the seal (78) is embodied as a double-lipped cuff, remote from the valve seat, an inner lip (79) of the double-lipped cuff (78) is received in the through bore (58) of the valve body (53), and an outer lip (82) of the double-lipped cuff engages an inside circumference of the valve block bore (85);

a bottom (81) that extends on a face end of the double-lipped cuff (78) is supported with an interposition of an annular disk (76), on a step (90) of the valve block bore (85);

an insert (73) having the form of a sleeve is engaged on its circumference by the inner lip (79) of the double-lipped cuff (78), a sleeve insert bottom (74), which has a bore (75), is located in a center opening (80) of the double-lipped cuff (78), and the sleeve insert (73) is axially supported at least indirectly on the annular disk (76).

2. The valve as defined by claim 1, in which:

a bushlike part (72) is received tightly in the center opening (80) of the double-lipped cuff (78);

a flange (77) of the bushlike part (72) engages the face end of the inner lip (79);

the annular disk (76) is fastened by crimping into the bushlike part (72); and the sleeve insert (73) is press-fitted into the bushlike part (72).

* * * * *